United States Patent [19]

Kinjo

[11] Patent Number: 4,774,610
[45] Date of Patent: Sep. 27, 1988

[54] TRANSDUCER ELEMENT ASSEMBLY COMPRISING A CANTILEVER DETACHABLY COUPLED TO A SUPPORT

[75] Inventor: Hisao Kinjo, Yokohama, Japan
[73] Assignee: Victor Company of Japan, Ltd., Japan
[21] Appl. No.: 938,580
[22] Filed: Dec. 5, 1986
[30] Foreign Application Priority Data Dec. 6, 1985 [JP] Japan .................................. 60-274692
Jan. 22, 1986 [JP] Japan .................................. 61-11413

[51] Int. Cl.[4] .......................... G11B 5/48; G11B 21/16; G11B 3/00
[52] U.S. Cl. ...................................... 360/104; 369/170
[58] Field of Search ............... 360/104, 105, 106, 100, 360/97-99; 369/147, 170, 126

[56] References Cited

U.S. PATENT DOCUMENTS 4,160,268 7/1979 Goto et al. .......................... 360/77 X
4,339,812 7/1982 Goto .................................. 369/170
4,360,909 11/1982 Tajima ................................ 369/170

FOREIGN PATENT DOCUMENTS 0067060 5/1978 Japan .
0067061 5/1978 Japan .
0151005 11/1979 Japan .
0147803 11/1979 Japan .................................. 369/170

*Primary Examiner*—Stuart N. Hecker
*Assistant Examiner*—David J. Severin
*Attorney, Agent, or Firm*—Roberts, Spiecens & Cohen

[57] ABSTRACT

A transducer element assembly comprises a transducer element having a scanning surface for scanning a recording surface of a recording medium, a cantilever having the transducer element provided on a free tip end thereof and having a pair of holes provided on a root end thereof, a support part having a pair of generally conical pivots, and a magnetic coupling mechanism provided on the cantilever and on the support part for magnetically coupling the two by a magnetic attraction or repulsion. The cantilever is detachably mounted on the support part and is user replaceable. When the cantilever is mounted on the support part, the pivots engage the corresponding holes and the cantilever is rotatable about the root end thereof in a direction approximately perpendicular to the scanning surface of the transducer element. The magnetic attraction or repulsion generated by the magnetic coupling mechanism acts with a predetermined magnitude in a predetermined direction so that the transducer element makes contact with the recording surface of the recording medium with a predetermined contact pressure.

21 Claims, 10 Drawing Sheets

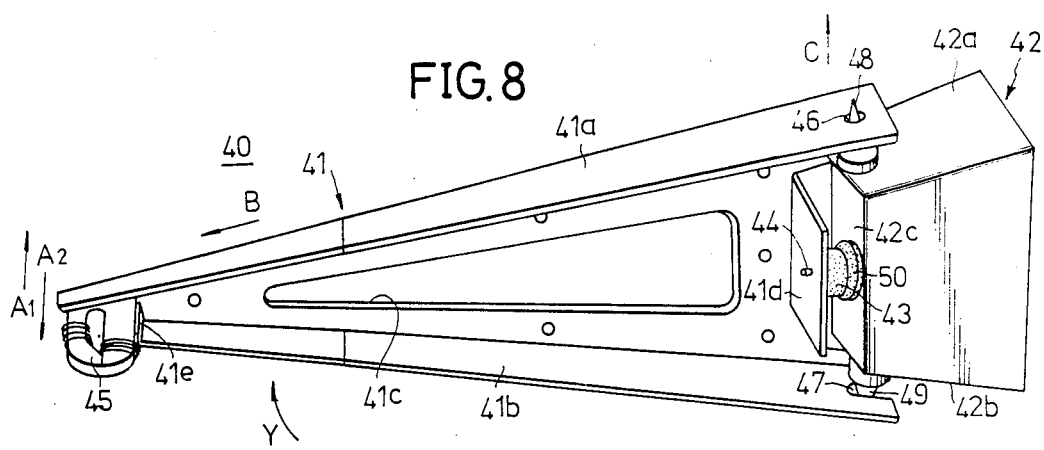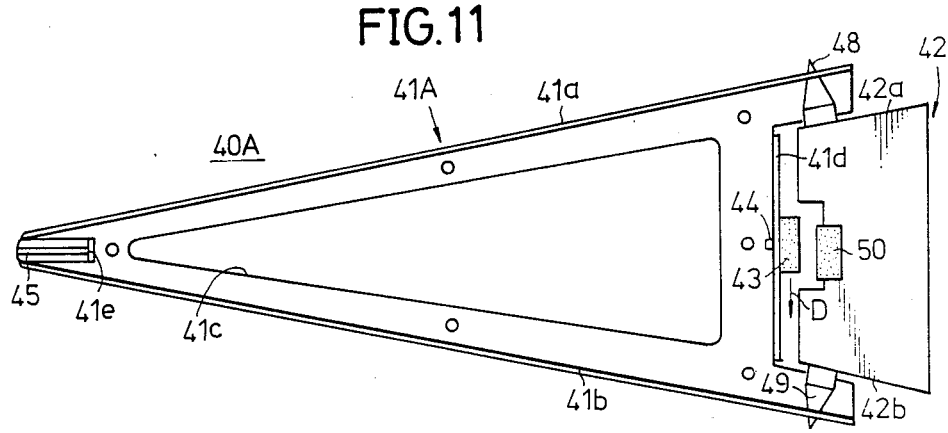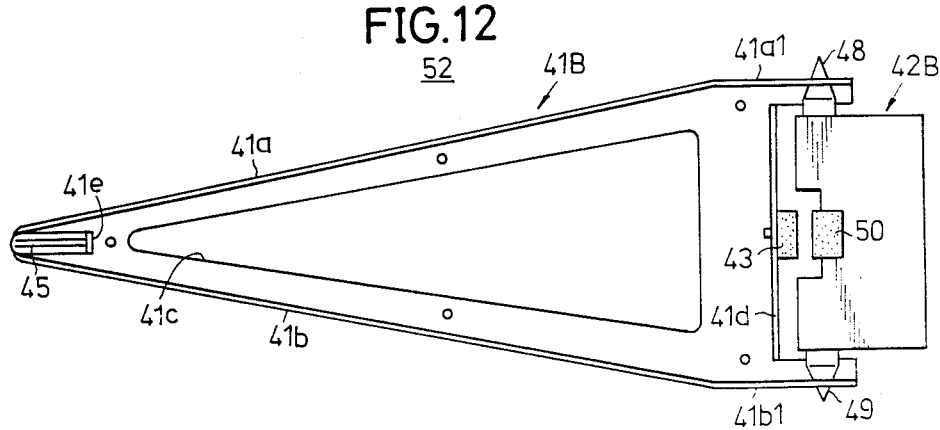

TRANSDUCER ELEMENT ASSEMBLY COMPRISING A CANTILEVER DETACHABLY COUPLED TO A SUPPORT

BACKGROUND OF THE INVENTION

The present invention generally relates to transducer element assemblies, and more particularly to a transducer element assembly having a transducer element for recording and/or reproducing an information signal on and/or from a rotary recording medium.

Currently an information signal is recorded on and reproduced from various recording mediums. As systems in which a transducer element records and/or reproduces the information signal by making direct contact with a recording surface of the recording medium, there are the magnetic recording and/or reproducing system and the electrostatic capacitance type recording and/or reproducing system, for example, and a magnetic head, a reproducing stylus and the like are used as the transducer element. When reproducing the information signal from the rotary recording medium such as a disc, it is necessary to carry out a tracking control so that the transducer element accurately scans over an intended track. The transducer element is provided on a tip end of a cantilever, and a root end of the cantilever is driven and displaced by an actuator so as to displace the transducer element in a direction of the width of the track to thereby carry out the tracking control.

A first example of the conventional transducer element assembly comprises a generally V-shaped cantilever and a transducer element provided at the valley part of the V-shaped cantilever. A pair of arms of the cantilever are mounted on a support plate via rubber dampers, and the support plate is driven and displaced by the actuator. The transducer element makes contact with the recording surface of the rotary recording medium with a predetermined contact pressure due to the resiliency of the rubber dampers. Such a transducer element assembly is shown in FIG. 15 of the U.S. Pat. No. 4,160,268, for example.

However, according to this first example of the conventional transducer element assembly, there is a problem in that torsion and vibration are easily generated at the transducer element due to the resonance of a mechanical resonant system constituted by the cantilever and the rubber dampers. In addition, when a loop gain of a tracking control system in a recording and/or reproducing apparatus is set to a large gain, there is a possibility of oscillation at high frequencies. Hence, it is possible to consider using rubber dampers having an extremely large stiffness, but in this case, the contact pressure of the transducer element on the recording surface of the rotary recording medium becomes too large. When the contact pressure of the transducer is large, the serviceable life of the transducer element is shortened, and the recording surface of the rotary recording medium is easily damaged. On the other hand, the characteristics of the rubber dampers are unstable with respect to changes in the environment such as the temperature and are subject to deterioration as being aged. Further, the chemical resistance of the rubber dampers is poor. Thus, there is also a problem in that the positioning accuracy of the cantilever with respect to the support plate is poor because of the unstable characteristics of the rubber dampers.

A second example of the conventional transducer element assembly comprises a generally triangular cantilever and a transducer element provided on a vertex portion of the triangular cantilever. A pair of conical arms and a permanent magnet are provided on the base portion of the cantilever. A pair of pivots and a permanent magnet are provided on a support plate which is driven and displaced by the actuator. The cantilever is mounted on the support plate so that the pair of conical arms engage corresponding grooves of the pivots on the support plate and the magnet on the cantilever confronts the magnet on the support plate with a gap between the two magnets. Tip ends of the conical arms are pressed against the corresponding grooves of the pivots due to a magnetic attraction between the two magnets. Such a transducer element assembly is disclosed in the U.S. Pat. No. 4,339,812, for example.

According to the second example of the conventional transducer element assembly, the problems of the first example of the conventional transducer assembly are eliminated because no rubber dampers are used. However, it requires complex processing in order to form the conical arms on the cantilever and to form the grooves of the pivots on the support plate. In addition, the conical arms must be mounted on the cantilever with a high precision so that the conical arms will precisely engage the corresponding grooves of the pivots when the cantilever is mounted on the support plate. As a result, there are problems in that the transducer element assembly has a complex construction and is expensive to manufacture. But since especially the cantilever portion of the transducer elmment assembly is a disposable type item which is user replaceable, it is desirable that the construction is simple and requires no complex processes to manufacture. Furthermore, it is desirable that the transducer element assembly can be manufactured at a low cost.

SUMMARY OF THE INVENTION

Accordingly, it is a general object of the present invention to provide a novel and useful transducer element assembly in which the problems described heretofore are eliminated.

Another and more specific object of the present invention is to provide a transducer element assembly comprising a transducer element having a scanning surface for scanning a recording surface of a recording medium, a cantilever having the transducer element provided on a free tip end thereof and having a pair of holes for receiving pivots provided on a root end thereof, a support part driven and displaced by an actuator and having a pair of generally conical pivots, and magnetic coupling means provided on the cantilever and on the support part for magnetically coupling the cantilever and the support part by a magnetic attraction. The cantilever is detachably mounted on the support part and is user replaceable. When the cantilever is mounted on the support part, the pivots of the support part engage the corresponding holes in the cantilever and the cantilever is rotatable about the root end thereof in a direction approximately perpendicular to the scanning surface of the transducer element. The magnetic attraction generated by the magnetic coupling means acts with a predetermined magnitude in a predetermined direction so that the transducer element makes contact with the recording surface of the recording medium with a predetermined contact pressure. According to the transducer element assembly of the present invention, the generally conical pivots which require complex processing are provided on the support part which is not user replaceable, and the cantilever which is a disposable type item simply needs to have the holes for engaging the pivots so as to mechanically couple to the support part. Therefore, the construction of the cantilever is simple, and the transducer element assembly can be manufactured at a low cost.

Still another object of the present invention is to provide a transducer element assembly of the type described above which further comprises means for preventing the cantilever from easily disengaging from the support part even when excessive external shock or vibration is applied to the transducer element assembly. According to the transducer element assembly of the present invention, it is possible to positively prevent an accident in which the cantilever disengages or dislodges from the support part due to the excessive external shock or vibration applied to the transducer element assembly.

A further object of the present invention is to provide a transducer element assembly comprising a transducer element having a scanning surface for scanning a recording surface of a recording medium, a cantilever having the transducer element provided on a free tip end thereof and having a pair of holes for receiving pivots provided on a root end thereof, a support part driven and displaced by an actuator and having a pair of generally conical pivots, and magnetic coupling means provided on the cantilever and on the support part for magnetically coupling the cantilever and the support part by a magnetic repulsion. The cantilever is detachably mounted on the support part and is user replaceable. When the cantilever is mounted on the support part, the pivots of the support part engage the corresponding holes in the cantilever and the cantilever is rotatable about the root end thereof in a direction approximately perpendicular to the scanning surface of the transducer element. The magnetic repulsion generated by the magnetic coupling means acts with a predetermined magnitude in a predetermined direction so that the transducer element makes contact with the recording surface of the recording medium with a predetermined contact pressure.

Other objects and further features of the present invention will be apparent from the following detailed description when read in conjunction with the accompanying drawings.

BRIEF DESCRIPTION OF THE DRAWINGS

FIG. 8 is a perspective view from the bottom showing a sixth embodiment of the transducer element assembly according to the present invention;

FIGS. 11 and 12 are bottom views respectively showing seventh and eighth embodiments of the transducer element assembly according to the present invention;

FIGS. 14 through 17A are perspective views respectively showing essential parts of tenth through thirteenth embodiments of the transducer element assembly according to the present invention.

DETAILED DESCRIPTION

Figure 1:
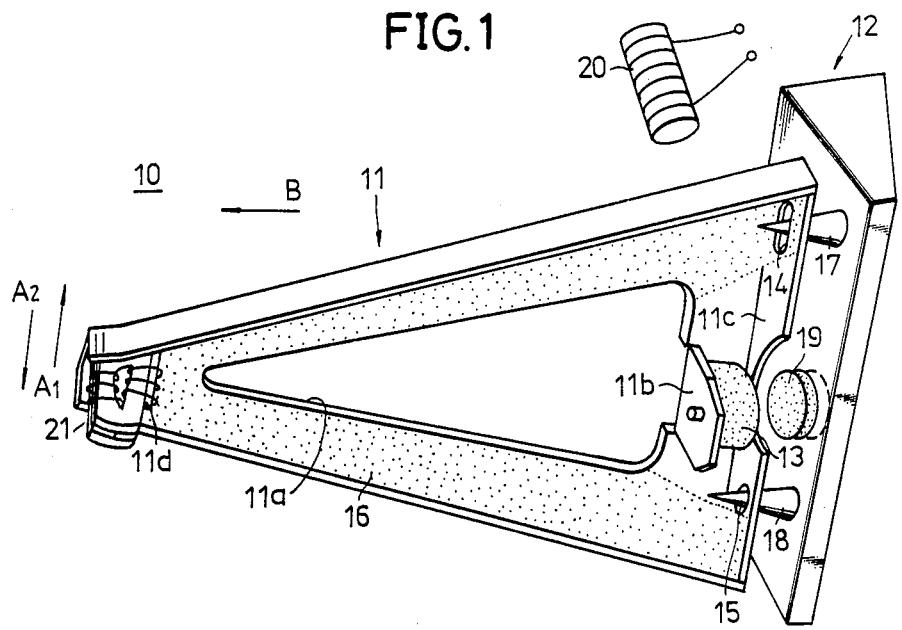
FIG. 1 is a perspective view from the bottom showing a first embodiment of the transducer element assembly according to the present invention.

FIG. 1 shows the first embodiment of the invention. A transducer element assembly 10 generally comprises a cantilever 11 and a support part 12. The cantilever 11 has a generally triangular shape, and has a triangular opening 11a, a mounting portion 11b provided at the base portion of the opening, a rear wall 11c, and a mounting 11d provided at a tip end portion thereof. A permanent magnet 13 is mounted on the mounting portion 11b, and a magnetic head 21 is mounted on the mounting portion 11d as an example of the transducer element. A pair of holes 14 and 15 for receiving pivots are formed in the rear wall 11c. The hole 14 has an elongated shape, and the hole 15 is circular. In the present embodiment, a vibration absorbing layer 16 made of a vibration absorbing agent such as a known adhesive agent which hardens to a rubber form, for example, is formed on a surface of the cantilever 11 as indicated by stippling. However, the vibration absorbing layer 16 may be omitted.

The support part 12 has a pair of generally conical pivots 17 and 18 and a permanent magnet 19. For example, the pivots 17 and 18 are made of stainless steel, ceramics and the like. The support part 12 is connected to an actuator (not shown) which will be described later, and is driven and displaced by the actuator.

The cantilever 11 is mechanically coupled to the support part 12 when the pivots 17 and 18 of the support part 12 are inserted into the corresponding holes 14 and 15. In this state, the magnets 13 and 19 confront each other with a gap therebetween. Furthermore, since the north and south poles of the magnets 13 and 19 are arranged so that a magnetic attraction is generated between the two magnets 13 and 19, the cantilever 11 and the support part 12 are magnetically coupled to each other to thereby maintain the mechanical coupling between the cantilever 11 and the support part 12. Accordingly, the cantilever 11 is rotatable about the root end thereof (in the vicinity of the rear wall 11c) in directions A1 and A2 which are approximately perpendicular to the scanning surface of the head 21. The magnetic attraction generated by magnetic coupling means constituted by the magnets 13 and 19 acts with a predetermined magnitude in a predetermined direction so that the head 21 makes contact with a recording surface of a recording medium (not shown) with a predetermined contact pressure by arranging relative positions of the magnets 13 and 19 and the positions of the pivots 17 and 18 or the holes 14 and 15. It is possible to excite an electromagnet 20 to attract the magnet 13 so as to rotate the cantilever 11 in the direction A1.

Because the hole 14 has an elongated shape, positional errors introduced in the production between the holes 14 and 15 and the pivots 17 and 18 are absorbed. In addition, by appropriately selecting the sizes of the holes 14 and 15, it is possible to control the gap between the confronting magnets 13 and 19 so as not to make contact with each other yet having a desired magnitude of attraction.

According to the present embodiment, the pivots 17 and 18 which require complex processing are provided on the support part 12 which is not user replaceable, and the cantilever 11 which is a disposable item simply needs to have the holes 14 and 15 for engaging the pivots 17 and 18 so as to mechanically couple to the support part 12. Therefore, the construction of the cantilever 11 is simple, and the transducer element assembly 10 can be manufactured at a low cost. Moreover, since the cantilever 11 is essentially coupled magnetically to the support part 12, the cantilever 11 can be detached from the support part 12 for replacement quickly and with ease by pulling the cantilever 11 in a direction B against the magnetic attraction generated by the magnetic coupling means.

Figure 2:
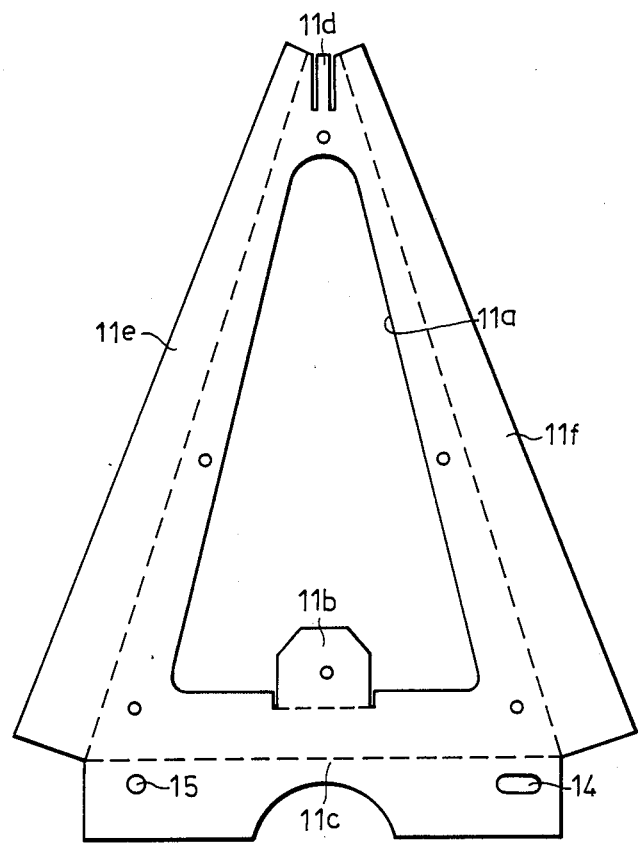
FIG. 2 is an expanded view showing the case where a cantilever shown in FIG. 1 is formed from sheet metal by folding processes.
Figure 3A:
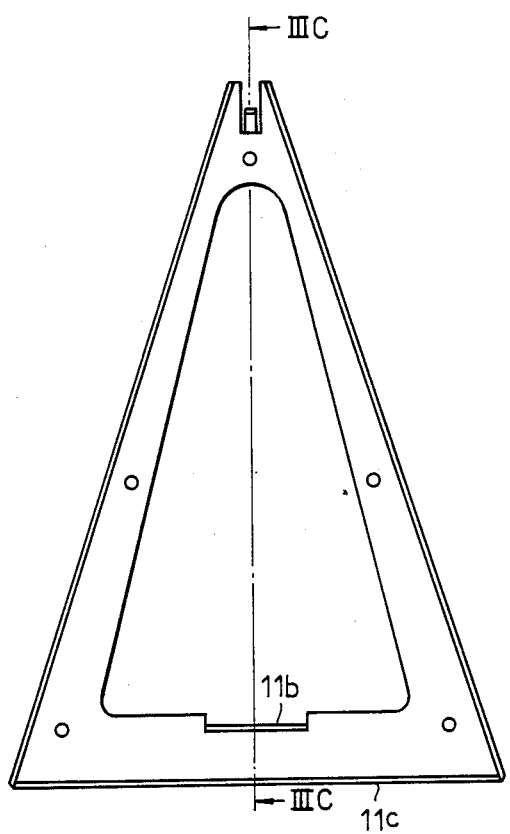
FIGS. 3A and 3B are a bottom view and a rear view respectively showing the cantilever shown in FIG. 1.
Figure 3C:
FIG. 3C is a cross sectional view along line IIIC—IIIC in FIG. 3A.
Figure 3B:
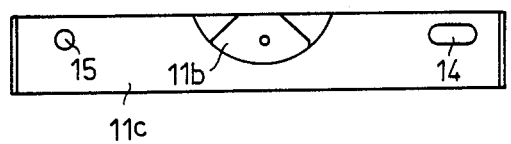

The cantilever 11 can be formed by carrying out folding processes on a thin metal sheet which is die-cut as shown in FIG. 2. For example, the thickness of the sheet metal is 0.1 mm. In FIG. 2, the die-cut sheet metal is subjected to folding processes for folding and forming the mounting portions 11b and 11c, the rear wall 11c and side walls 11e and 11f along phantom lines. FIGS. 3A and 3B respectively show the bottom view and the rear view of the cantilever 11 which is formed from such a die-cut sheet metal. FIG. 3C shows the cross section of the cantilever 11 along the line IIIC—IIIC in FIG. 3A. For example, materials such as aluminum, beryllium, titanium and phosphor bronze may be used for the sheet metal.

Figure 4:
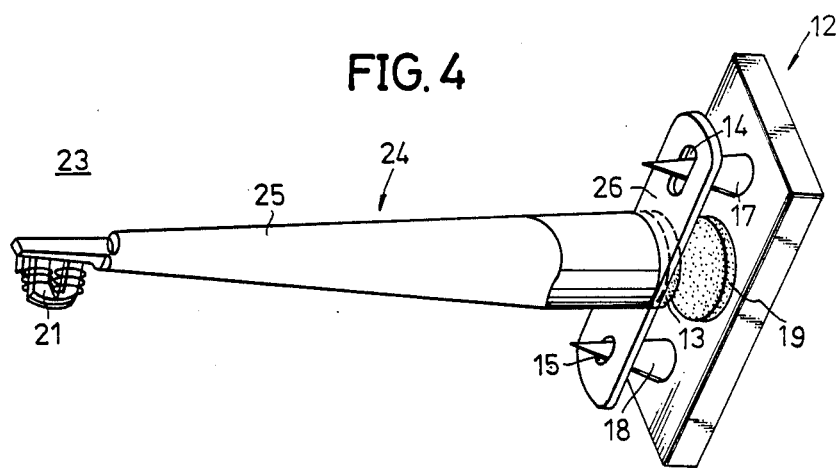
FIGS. 4 and 5 are perspective views respectively showing second and third embodiments of the transducer element assembly according to the present invention.

FIG. 4 shows the second embodiment of the invention. In FIG. 4, those parts which are the same as those corresponding parts in FIG. 1 are designated by the same reference numerals, and description thereof will be omitted. A transducer element assembly 23 comprises a cantilever 24 and the support part 12. The cantilever 24 comprises a tube 25 having the head 21 provided on a tip end thereof, and a coupling plate 26 fixed to a root end of the tube 25. For example, the tube 25 is made of aluminum. The holes 14 and 15 are formed in the coupling plate 26, and the magnet 13 is fixed to a bottom surface of the coupling plate 26 at such a position that the magnet 13 will confront the magnet 19 with a gap formed therebetween when the cantilever 24 is coupled to the support part 12.

Figure 5:
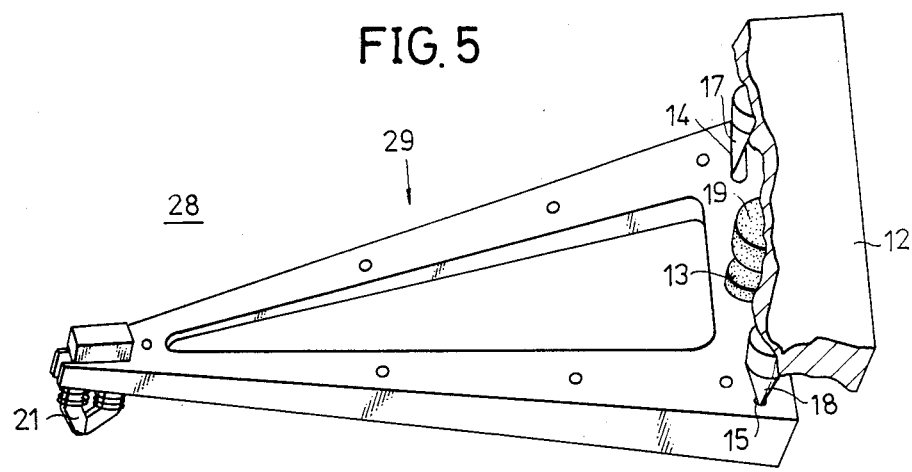

FIG. 5 shows the third embodiment of the invention. In FIG. 5, those parts which are the same as those corresponding parts in FIG. 1 are designated by the same reference numerals, and description thereof will be omitted. In a transducer element assembly 28 of the present embodiment, the holes 14 and 15 and the magnet 13 are provided on a top surface of a cantilever 29, but the construction of the transducer element assembly 28 is basically the same as that of the first embodiment.

Figure 6:
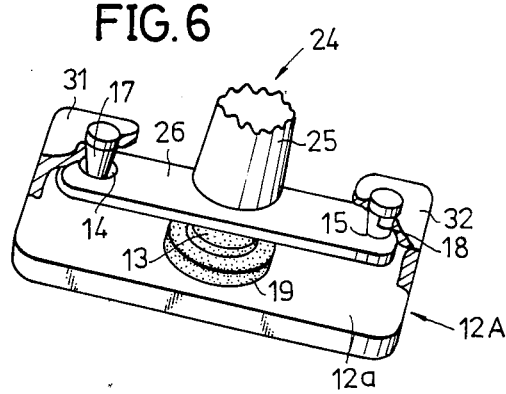
FIGS. 6 and 7 are perspective views respectively showing essential parts of fourth and fifth embodiments of the transducer element assembly according to the present invention.

FIG. 6 shows an essential part of the fourth embodiment of the invention. In FIG. 6, those parts which are the same as those corresponding parts in FIG. 4 are designated by the same reference numerals, and description thereof will be omitted. In the present embodiment, the construction of a support part 12A and the arrangement of the magnets 13 and 19 are different from the second embodiment. Inverted L-shaped portions 31 and 32 are provided on both sides on a surface 12a of the support part 12A as partially shown in cross section, and the pivots 17 and 18 project toward the surface 12a from the respective inverted L-shaped portions 31 and 32. The north and south poles of the magnets 13 and 19 are arranged so that a magnetic repulsion is generated between the two magnets 13 and 19 when the cantilever 24 is coupled to the support part 12A. Accordingly, the mechanical coupling between the cantilever 24 and the support part 12A is maintained by the magnetic repulsion which urges the coupling plate 26 in a direction away from the surface 12a. According to the present embodiment, the cantilever 24 will not easily disengage from the support part 12A even when excessive external shock or vibration is applied to the transducer element assembly. In addition, the magnetic repulsion generated by magnetic coupling means constituted by the magnets 13 and 19 acts with a predetermined magnitude in a predetermined direction so that the head makes contact with the recording surface of the recording medium with a predetermined contact pressure.

Figure 7:
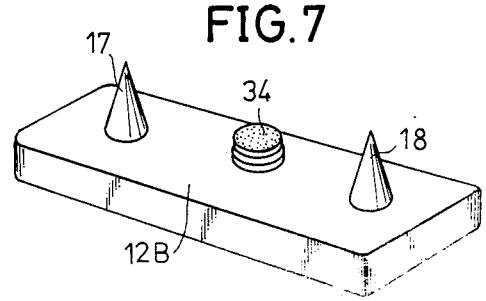

FIG. 7 shows a support part 12B which constitutes an essential part of the fifth embodiment of the invention. In the present embodiment, the construction of the support part 12B is basically the same as that of the support part 12 described before except that an electromagnet 34 is provided instead of the magnet 19. According to the present embodiment, it is possible to control the contact pressure of the head with respect to the recording surface of the recording medium by controlling a current which is supplied to the electromagnet 34.

According to the first, second, third and fifth embodiments described heretofore, the cantilever can be detachably coupled to the support part with ease by using the magnetic attraction generated by the magnetic coupling means. However, the pivots of the support part are simply inserted into the corresponding holes in the cantilever without having additional means for interlocking the cantilever and the support part. For this reason, when excessive external shock or vibration is applied to the transducer element assembly, the cantilever may disengage from the support part. The problem may be lessened by enlarging the holes in the cantilever, but in this case, the cantilever will not be able to rotate smoothly.

On the other hand, according to the fourth embodiment, the cantilever will not easily disengage from the support part even when excessive external shock or vibration is applied to the transducer element assembly. However, since the fourth embodiment uses magnetic repulsion, the cantilever must be coupled to the support part against the magnetic repulsion when engaging the holes to the corresponding pivots. For this reason, the cantilever cannot be attached to and detached from the support part as easily as in the case of the first, second, third and fifth embodiments.

Next, description will be given with respect to embodiments in which the cantilever can be attached to and detached from the support part with ease, and the transducer element assembly is further provided with means for preventing unwanted disengagement of the cantilever from the support part due to excessive external shock or vibration applied thereto.

FIG. 8 shows the sixth embodiment of the invention. A transducer element assembly 40 generally comprises a cantilever 41 and a support part 42. The cantilever 41 has a generally triangular shape, and has side walls 41a and 41b, a triangular opening 41c, a mounting portion 41d provided in a vicinity of the base portion of the triangular opening 41c, and a mounting portion 41e provided at a tip end portion thereof. As will be described later in conjunction with FIG. 10C, the cantilever 41 has a bend at an intermediate portion thereof. A permanent magnet 43 is mounted on the mounting portion 41d by a pin 44, and a magnetic head 45 is mounted on the mounting portion 41e as an example of the transducer element. A circular hole 46 for receiving a pivot is formed in the side wall 41a and an elongated hole 47 for receiving a pivot is formed in the side wall 41b, respectively at the root end of the cantilever 41. The elongated hole 47 has a V-shape and is open on one end thereof. In the present embodiment and the embodiments which will be described later, the illustration of a vibration absorbing layer is omitted. However, it is of course possible to form the vibration absorbing layer on a surface of the cantilever as in the case of the first embodiment shown in FIG. 1.

Generally conical pivots 48 and 49 are respectively provided on side surfaces 42a and 42b of the support part 42, and the pivots 48 and 49 project in directions perpendicular to the respective side surfaces 42a and 42b. A permanent magnet 50 is provided on a front surface 42c of the support part 42. The support part 42 is driven and displaced by the actuator which will be described later.

The cantilever 41 is mechanically coupled to the support part 42 by first inserting the pivot 48 of the support part 42 into the corresponding hole 46 and next inserting the pivot 49 into the corresponding hole 47. In this state, the magnets 43 and 50 confront each other with a gap therebetween. Furthermore, since the north and south poles of the magnets 43 and 50 are arranged so that a magnetic attraction is generated between the two magnets 43 and 50, the cantilever 41 and the support part 42 are magntically coupled to each other to thereby maintain the mechanical coupling between the cantilever 41 and the support part 42. Accordingly, the cantilever 41 is rotatable about the root end thereof (in the vicinity of the holes 46 and 47) in directions A1 and A2 which are approximately perpendicular to the scanning surface of the head 45. The magnetic attraction generated by magnetic coupling means constituted by the magnets 43 and 50 acts with a predetermined magnitude in a predetermined direction so that the head 45 makes contact with a recording surface of a recording medium (not shown) with a predetermined contact pressure.

Since the hole 47 is open to the rear end of the side wall 41b, positional errors introduced in the production between the holes 46 and 47 and the pivots 48 and 49 are absorbed. According to the present embodiment, the cantilever 41 is supported at the sides thereof. Hence, in addition to the advantageous effects obtained in the first embodiment and the like, there is a further advantage in that the cantilever 41 will not easily disengage from the support part 42 even when excessive external shock or vibration is applied to the transducer element assembly 40. Particularly, the cantilever 41 will not disengage from the support part 42 when a force acts on the cantilever 41 to pull the cantilever 41 in the direction B. The cantilever 41 can be detached from the support part 42 quickly and easily by first disengaging the pivot 49 from the hole 47 by pulling the cantilever 41 in a direction Y and then pulling the cantilever 41 in a direction C in which the pivot 48 generally extends.

Figure 9:
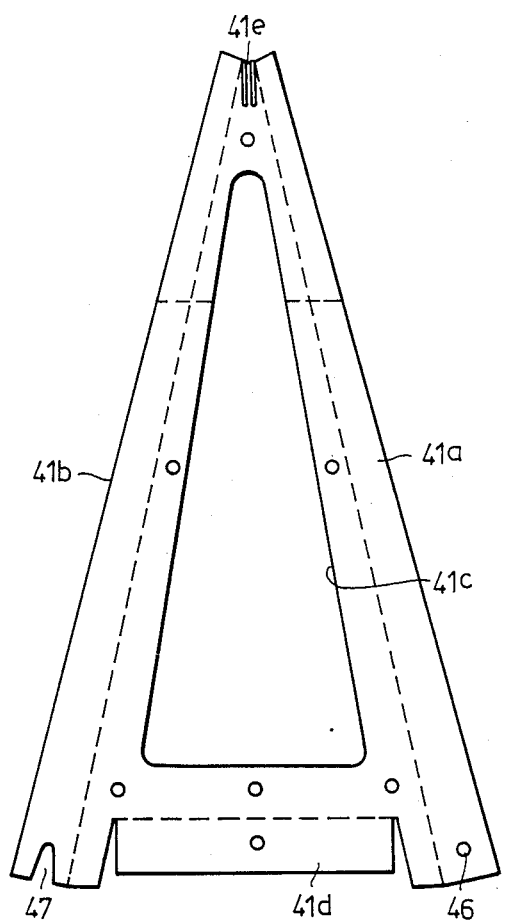
FIG. 9 is an expanded view showing the case where a cantilever shown in FIG. 8 is formed from sheet metal by folding processes.
Figures 10A, 10C:
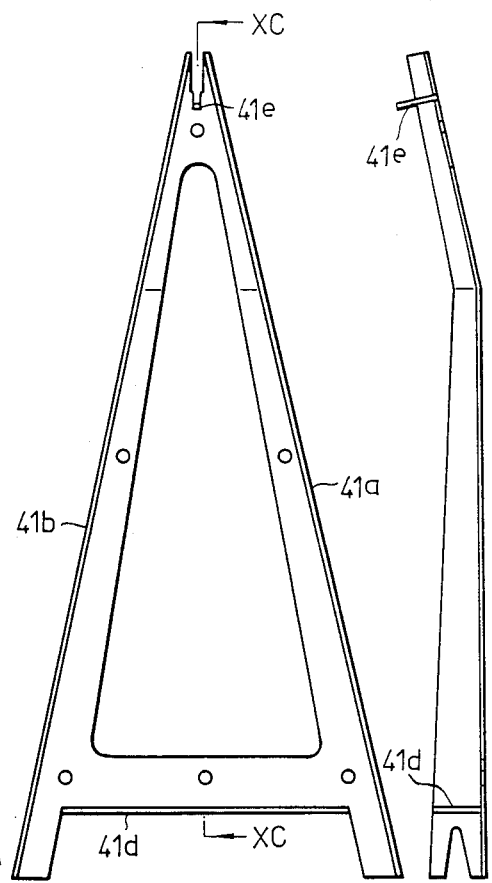
FIGS. 10A and 10B are a bottom view and a rear view respectively showing the cantilever shown in FIG. 8.
FIG. 10C is a cross sectional view along line XC—XC in FIG. 10A.
Figure 10B:
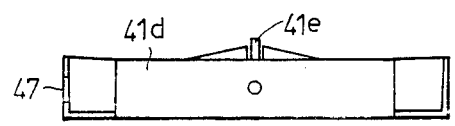

The cantilever 41 can be formed by carrying out folding processes on a thin sheet metal which is die-cut as shown in FIG. 9, similarly as in the case shown in FIG. 2. For example, the thickness of the sheet metal is in the order of 0.1 mm. In FIG. 9, the die-cut sheet metal is subjected to folding processes for folding and forming the side walls 41a and 41b, the mounting portions 41d and 41e, and the bend described before along phantom lines. FIGS. 10A and 10B respectively show the bottom view and the rear view of the cantilever 41 which is formed from such a die-cut sheet metal. FIG. 10C shows the cross section of the cantilever 41 along the line XC—XC in FIG. 10A.

FIG. 11 shows the seventh embodiment of the invention. In FIG. 11, those parts which are the same as those corresponding parts in FIG. 8 are designated by the same reference numerals, and description thereof will be omitted. The present embodiment is basically the same as the sixth embodiment except that the magnet 50 is mounted at a position deviated toward the pivot 49 from the position perfectly confronting the magnet 43. According to a transducer element assembly 40A shown in FIG. 11, the cantilever 41A is also urged in a direction D due to the magnetic attraction between the two magnets 43 and 50. As a result, the cantilever 41A can be coupled more positively to the support part 42, and the unwanted disengagement of the cantilever 41A from the support part 42 due to excessive external shock or vibration is more positively prevented.

FIG. 12 shows the eighth embodiment of the invention. In FIG. 12, those parts which are the same as those corresponding parts in FIG. 8 are designated by the same reference numerals, and description thereof will be omitted. In the present embodiment, a cantilever 41B of a transducer element assembly 52 has side wall portions 41a1 and 41b1 at the root end thereof. The side wall portions 41a1 and 41b1 are approximately parallel to each other, and the holes 46 and 47 are formed in the side wall portions 41a1 and 41b1, respectively. In addition, the side surfaces 42a and 42b of a support 42B are also approximately parallel to each other, and are approximately parallel to the corresponding and confronting side wall portions 41a1 and 41b1 of the cantilever 41B. The pivots 48 and 49 project approximately perpendicularly from the respective side surfaces 42a and 42b.

Figure 13:
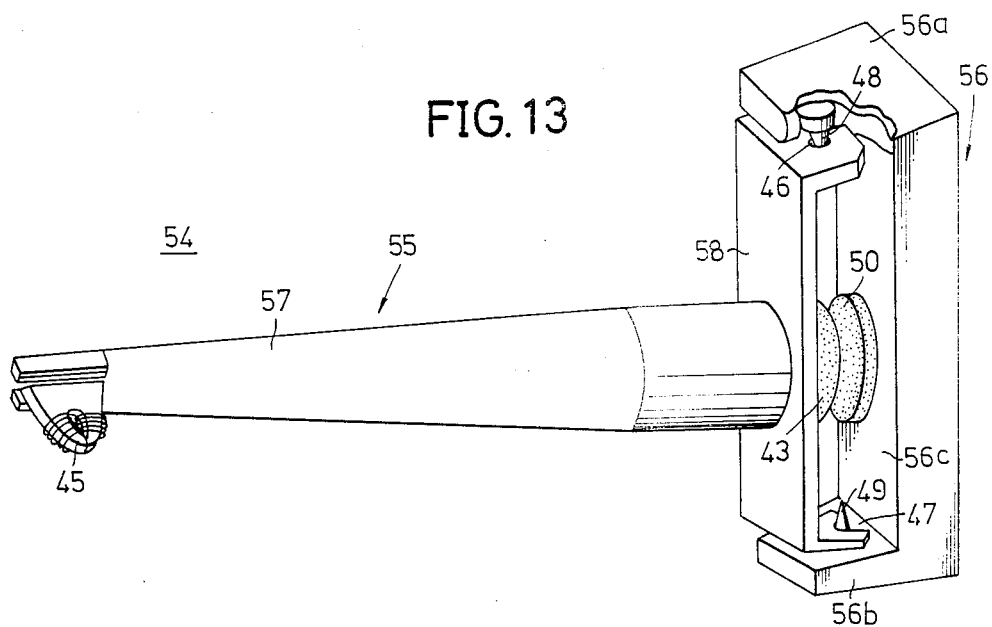
FIG. 13 is a perspective view showing a ninth embodiment of the transducer element assembly according to the present invention.

FIG. 13 shows the ninth embodiment of the invention. In FIG. 13, those parts which are the same as those corresponding parts in FIG. 8 are designated by the same reference numerals, and description thereof will be omitted. A transducer element assembly 54 comprises a cantilever 55 and a support part 56. The cantilever 55 comprises a tube 57 having the head 45 provided on a tip end thereof, and a coupling member 58 fixed to the root end of the tube 57. The coupling member 58 has a generally U-shape and has side wall portions 58a and 58b, and the holes 46 and 47 are formed in the respective side wall portions 58a and 58b. The magnet 43 is mounted on a bottom surface of the coupling member 58 at such a position that the magnet 43 confronts the magnet 50 with a gap formed therebetween when the cantilever 55 is coupled to the support part 56.

On the other hand, the support part 56 has a generally U-shape and has side wall portions 56a and 56b. The pivots 48 and 49 are provided on the respective side wall portions 56a and 56b so as to confront each other. The magnet 50 is mounted on a front surface 56c of the support part 56. The cantilever 55 is coupled to the support part 56 by fitting the coupling member 58 into the U-shape of the support part 56 so that the pivots 48 and 49 engage the corresponding holes 46 and 47.

Figure 14:
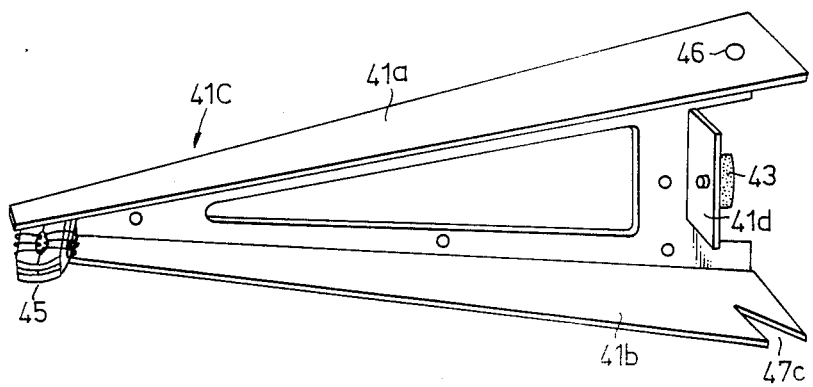

FIG. 14 shows a cantilever 41C which constitutes an essential part of the tenth embodiment of the invention. In the present embodiment, the cantilever 41C differs from that of the sixth embodiment in that an elongated V-shaped hole 47C formed in the side wall 41b of the cantilever 41C is open generally to the rear end but is inclined with respect to a generally longitudinal direction of the cantilever 41C. The cantilever 41C may be used with either one of the support parts shown in FIGS. 8 and 13.

Figure 15:
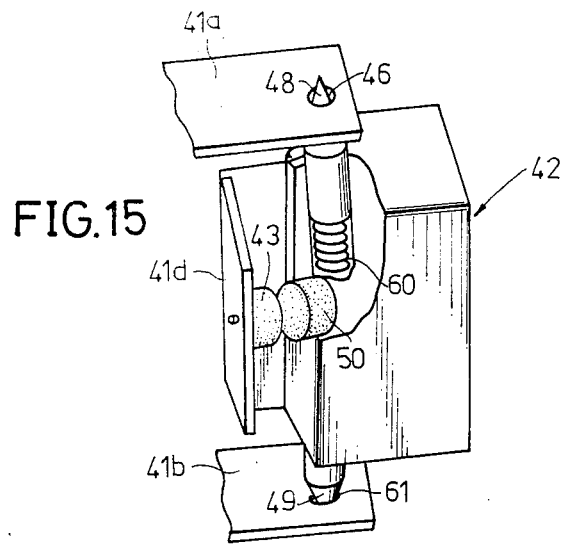
Figure 16:
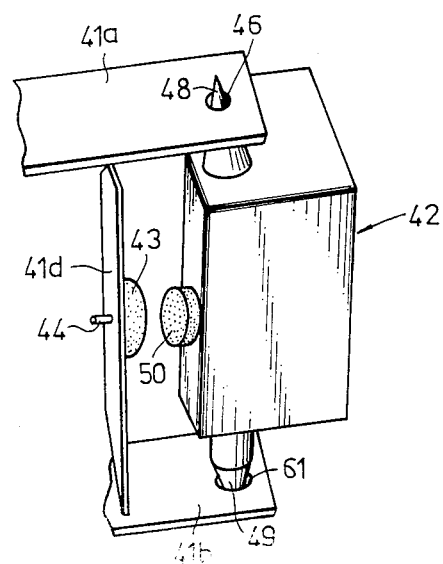

FIGS. 15 through 17 show essential parts of the eleventh through thirteenth embodiments of the invention, respectively. In the eleventh embodiment shown in FIG. 15, at least one of the pivots (the pivot 48 in FIG. 15) is slidable in a direction generally perpendicular to the side surface 42a of the support part 42 as partially shown in cross section. In addition, the one pivot 48 is loaded with a coil spring 60 and is constantly urged to the outside in the direction generally perpendicular to the side surface 42a. Furthermore, the holes 46 and 61 formed in the side walls 41a and 41b of the cantilever are both circular. The cantilever is coupled to the support part 42 by compressing the coil spring 60 and engaging the pivots 48 and 49 to the corresponding holes 46 and 61.

In the twelfth embodiment shown in FIG. 16, the holes 46 and 61 formed in the side walls 41a and 41b of the cantilever are both circular. However, at least one of the side walls 41a and 41b has a leaf spring structure and is resiliently deformable. Hence, the cantilever is coupled to the support part 42 by resiliently deforming the side walls 41a and/or 41b and engaging the pivots 48 and 49 to the corresponding holes 46 and 61.

In FIGS. 15 and 16, one of the two holes, that is, the hole 61, for example, may be made larger than the other hole 46. In this case, positional errors introduced in the production between the holes 46 and 61 and the pivots 48 and 49 are absorbed. According to the eleventh and twelfth embodiments, the cantilever will not easily disengage from the support part even when excessive external shock or vibration is applied to the transducer element assembly.

Figure 17A:
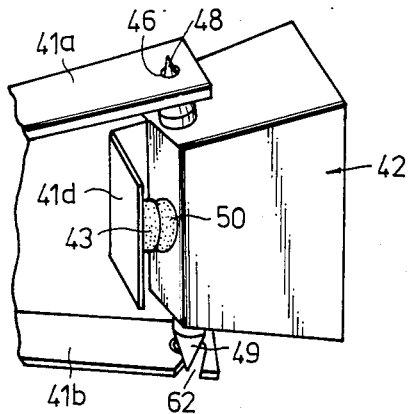
Figure 17B:
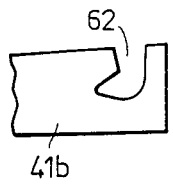
FIG. 17B is a side view showing an essential part of the thirteenth embodiment.

In the thirteenth embodiment shown in FIGS. 17A and 17B, a hole 62 formed in the side wall 41b of the cantilever has a generally L-shape one leg of which is extending toward a front of the cantilever and another leg is open to an edge of the side wall 41a. The one leg extending toward the front may have an arrow shape pointing the front for secure engagement with the pivot 80 as shown in FIG. 17B. For this reason, the cantilever will not easily disengage from the support part even when excessive external shock or vibration is applied to the transducer element assembly.

Figure 18:
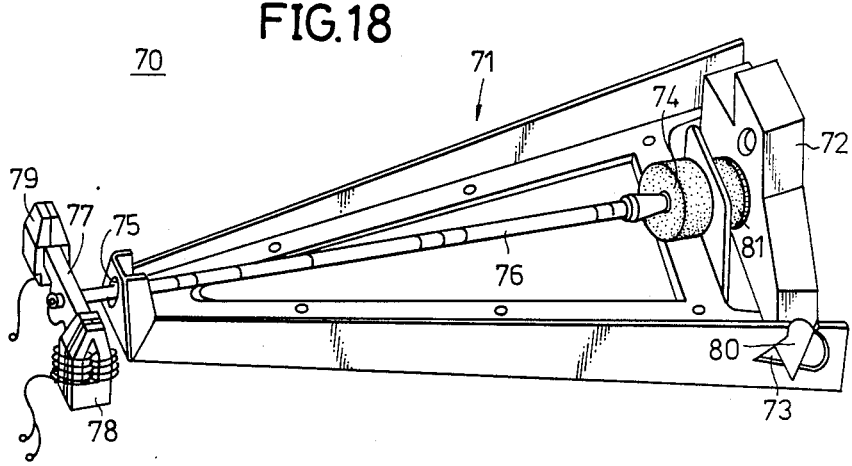
FIG. 18 is a perspective view from the bottom showing a fourteenth embodiment of the transducer element assembly according to the present invention.

FIG. 18 shows the fourteenth embodiment of the invention. A transducer element assembly 70 generally comprises a cantilever 71 and a support part 72. The cantilever 71 has a generally triangular shape, and a pair of holes 73 (only one shown) for receiving pivots are formed in side walls at the root end thereof. The hole 73 which is not shown has a circular shape, and the hole 73 which is shown has a generally L-shape. A permanent magnet 74 is fixed to a front surface of a rear wall of the cantilever 71. A hole 75 is formed in a front wall of the cantilever 71, and a rotatable rod 76 which extends from the magnet 74 penetrates the front wall of the cantilever 71 through the hole 75. A transducer element supporting member 77 is fixed to a tip end of the rod 76 in a T-shape, and a magnetic head 78 and a reproducing stylus 79 are fixed to respective ends of the supporting member 77. The reproducing stylus 79 is an electrostatic capacitance type reproducing stylus.

A pair of generally conical pivots 80 (only one shown) are provided on both sides of the support part 72. The pivots 80 project in a direction approximately perpendicular to the side walls of the cantilever 71. A permanent magnet 81 is fixed to a front surface of the support part 72.

The cantilever 71 is mechanically coupled to the support part 72 by inserting the pivots 80 into the respective holes 73. In this state, the magnets 74 and 81 confront each other via the rear wall of the cantilever 71 and a gap formed between the magnets 74 and 81. The north and south poles of the magnets 74 and 81 are arranged so that a magnetic attraction is generated between the magnets 74 and 81. Accordingly, the cantilever 71 and the support part 72 are coupled magnetically by the magnetic attraction, and the above described mechanical coupling is maintained. In addition, as in the case of the embodiments described heretofore, the contact pressure of the head 78 and the reproducing stylus 79 with respect to a recording surface of a recording medium (not shown) can be appropriately set by the magnetic attraction.

In the embodiments described heretofore, a combination comprising a pair of permanent magnets or a combination comprising an electromagnet and a permanent magnet is used as the magnetic coupling means. However, the magnetic coupling means is not limited to these combinations, and for example, a combination comprising a permanent magnet or an electromagnet and a metal part attracted thereby may be used when obtaining the magnetic attraction.

In addition, the transducer element is not limited to the magnetic head and the electrostatic capacitance type reproducing stylus.

Figure 19:
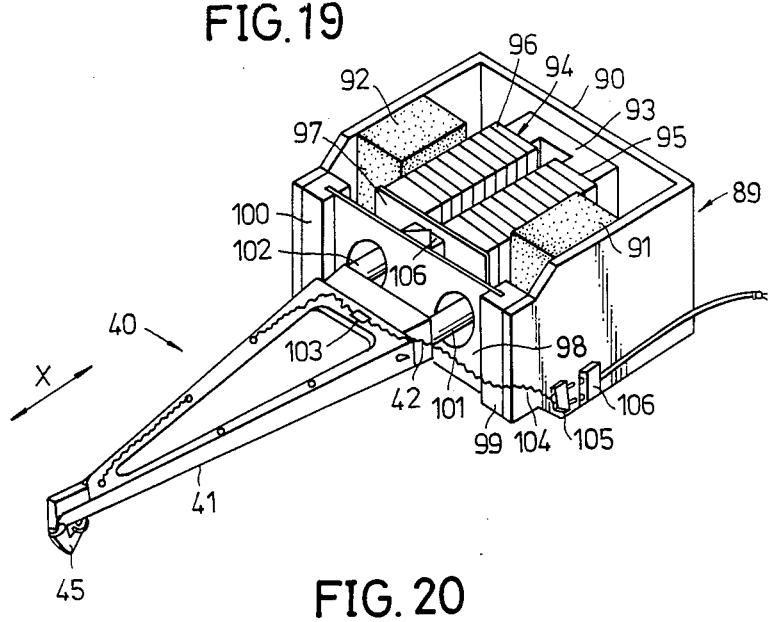
FIG. 19 is a perspective view showing the transducer element assembly according to the present invention together with an actuator of a recording and/or reproducing apparatus.

Next, description will be given with respect to the connection of the transducer element assembly according to the present invention and the actuator, by referring to FIG. 19. For convenience' sake, the transducer element assembly 40 shown in FIG. 8 will be used as the transducer element assembly. The construction of an actuator 89 itself is known. A frame member 90 is formed by bending a magnetic material into a substantially U-shape. Permanent magnets 91 and 92 are fixed to inner sides of arm portions of the frame member 90, and a U-shaped yoke 93 is fixed on the base part of the frame member 90 between the magnets 91 and 92. A moving body 94 comprises a pair of coils 95 and 96 wound in a rectangular form. Each of the coils 95 and 96 respectively are adjacent to a stiff support plate 97 and are fixed thereto. A leaf spring 98 made of phosphor bronze, for example, is provided across between tip ends of the arm portions of the frame member 90, in a state where both sides of the leaf spring 98 are respectively supported by rubber supports 99 and 100. A pair of connecting members 101 and 102 respectively having one end thereof fixed to the support plate 97, penetrate through a pair of openings provided in the leaf spring 98. The connecting members 101 and 102 respectively have the other end thereof fixed to the rear surface of the support part 42. Terminals of the head 45 are electrically coupled to a recording and/or reproducing apparatus (not shown) by inserting a plug 105 into a socket 106 which is provided on the frame member 90. Wires 104 from the terminals of the head 45 are coupled to the plug 105 via a buffer circuit 103 provided on the cantilever 41. The displacement of the moving body 94 responsive to a control signal current is accurately transmitted to the support part 42 via the connecting members 101 and 102, and the head 45 is thereby displaced in a direction X and the tracking control operation is accurately carried out.

Figure 20:
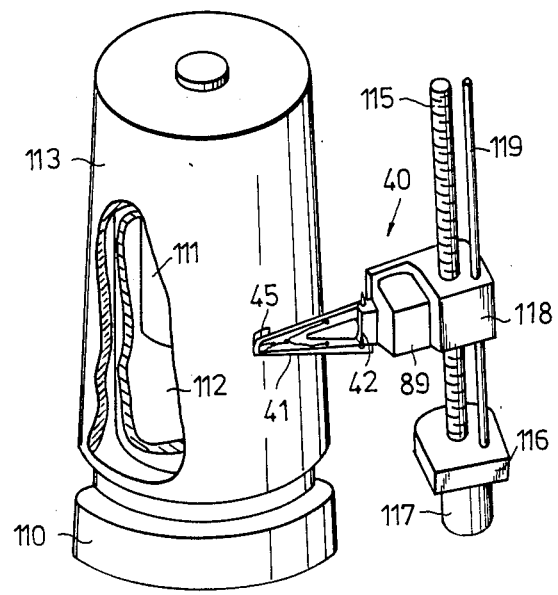
FIG. 20 is a perspective view for explaining the case where the transducer element assembly according to the present invention is applied to the recording and/or reproduction of an information signal with respect to a cylindrical shaped recording medium.

Next, description will be given with respect to the application of the transducer element assembly according to the present invention to the recording and/or reproduction of an information signal on and/or from a cylindrical recording medium, by referring to FIG. 20. For convenience' sake, it will be assumed that the combination of the transducer element assembly 40 and the actuator 89 shown in FIG. 19 is used. A recording medium driving part of the apparatus comprises a recording medium support 110, a motor 111, and a motor housing 112. A cylindrical recording medium 113 which is placed on the support 110 is rotated by the motor 111. A carriage driving part of the apparatus comprises a feed screw 115, and a motor 117 which rotates the feed screw 115 via a reduction gear 116. A carriage 118 is guided by a guide rod 119 and is moved upwardly and downwardly by the rotation of the feed screw 115. The actuator 89 is fixed to the carriage 118. Accordingly, the head 45 moves along a magnetic recording surface of the cylindrical recording medium 113 and forms closed loop tracks on the magnetic recording surface.

The recording medium which is used to carry out the recording and/or reproduction of the information signal is not limited to the cylindrical recording medium, and it is possible to use any rotary recording medium such as a disc.

Moreover, the support part of the transducer element assembly may be connected directly to the carriage of the recording and/or reproducing apparatus.

Further, the present invention is not limited to these embodiments, but various variations and modifications may be made without departing from the scope of the present invention.

What is claimed is:

1. A transducer element assembly comprising: at least one transducer element having a scanning surface for scanning a recording surface of a recording medium; a cantilever having a distal free end and a root end, the transducer element being mounted on the cantilever at said distal free end, said cantilever including a wall portion extending from said root end towards said distal free end, said wall portion being provided with a pair of holes;
a support part including a pair of generally conical pivots each of which projects along a line perpendicular to said wall;
magnetic coupling means on the cantilever and the support part for magnetically coupling the cantilever and the support part by a magnetic force,
said cantilever being detachably connectable to said support part, said pivots of the support part being respectively engaged in said holes in the wall portion of said cantilever so that the cantilever is supported by said pivots on said support part when the cantilever is coupled to the support part and the cantilever is rotatable about an imaginary line connecting said holes,
said magnetic force generated by said magnetic coupling means acting with a predetermined magnitude in a predetermined direction so that said transducer element makes contact with the recording surface of the recording medium with a predetermined contact pressure.

2. A transducer element assembly as claimed in claim 1 in which said magnetic coupling means comprises a permanent magnet provided at the root end of said cantilever and an electromagnet provided on said support part so as to confront each other with a gap formed between said permanent magnet and said electromagnet.

3. A transducer element assembly as claimed in claim 1 in which said cantilever is provided with a vibration absorbing layer on a surface thereof.

4. A transducer element assembly as claimed in claim 1 in which said support part is driven and displaced by driving means.

5. A transducer element assembly as claimed in claim 1 in which said cantilever is a folded die-cut metal sheet made of aluminum, beryllium, titanium or phospher bronze.

6. A transducer element assembly as claimed in claim 1 in which said magnetic coupling means comprises a pair of permanent magnets respectively provided at the root end of said cantilver and on said support part so as to confront each other with a gap formed between the two permanent magnets.

7. A transducer element assembly as claimed in claim 6 in which alone of said holes has a generally ciruclar shape and the other of said holes has an open end, said pair of permnent magnets being provided at positions deviated along a generally projecting direction of one of said pivots so that said magnetic force also acts in a direction urging said one pivot to engage with said one hole.

8. A transducer element assembly as claimed in claim 1 in which said cantilever has a generally T-shape.

9. A transducer element assembly as claimed in claim 8 in which said cantilever comprises a tubular member having the transducer element provided on a tip end thereof and a coupling member having a central part thereof fixed to a root end of said tubular member to form a T-shape with said tubular member, said wall portion compriising a pair of side walls extending from opposite ends of said central part, said holes being formed in said side walls, respectively.

10. A transducer element assembly as claimed in claim 1 in which said wall portion comprises a top wall of said cantilver and said holes are formed on said top wall side by side in a vicinity of a root end of said top wall.

11. A transducer element assembly as claimed in claim 10 in which one of said holes has a generally circular shape and the other of said holes has a shape elongated along a direction of said imaginary line connecting said holes.

12. A transducer element assembly as claimed in claim 10 in which said cantilever has a generally triangularr shape, said transducer element being provided on the cantilever at a vertex portion of the triangular shape, said holes being formed in said top all in a vicinity of base of the triangular shape cantilver.

13. A transducer element assembly as claimed in claim 1 in which said holes are formed in confronting relation to each other in the vicinity of the root end of said cantilver.

14. A transducer element assembly as claimed in claim 13 in which one of said holes has a generally circular shape and the other of said holes has an open end.

15. A transducer element assembly as claimed in claim 14 in which said other of said holes has a generally V-shape.

16. A transducer element assembly as claimed in claim 14 in which said other of said holes has a generally L-shape.

17. A transducer element assembly as claimed in claim 13 in which said cantilever has a generally triangular shape, said transducer element being provided on the cantilever at a vertex portion of the triangular shape, said wall portion comprising a pair of side walls extending along two sides of the triangular shape other than the base of the triangular shape, said holes being formed respectively in said side walls in the vicinity of the base of the triangular shape.

18. A transducer element assembly as claimed in claim 17 in which said support part has side surfaces which are approximately parallel to said side walls, said pivots being provided on said side surfaces of the support part and projecting approximately perpendicularly to said side surfaces.

19. A transducer element assembly as claimed in claim 17 in which said side walls of the cantilever have side wall portions which are approximately parallel to each other in the vicinity of the root end of the cantilever.

20. A transducer element assembly as claimed in claim 17 in which each of said holes have a circular shape, at least one of said side walls being resiliently deformable in a vicinity of said holes.

21. A transducer element assembly as claimed in claim 17 in which each of said holes have a circular shape, at least one of said pivots being loaded with a coil spring which urges the pivot in a direction so as to engage a corresponding one of said holes.

* * * * *